United States Patent
Brotzmann et al.

(10) Patent No.: US 9,546,047 B2
(45) Date of Patent: Jan. 17, 2017

(54) SLAT CONVEYOR FOR EXTRACTION SYSTEMS AND TRANSPORT PLATES THEREFOR

(71) Applicant: CATERPILLAR GLOBAL MINING EUROPE GMBH, Lünen (DE)

(72) Inventors: Gerhard Brotzmann, Dortmund (DE); Oliver Kortmann, Werne (DE); Joachim Raschka, Bochum (DE); Hendrik Padberg, Arnsberg (DE); Robert Voigt, Bochum (DE)

(73) Assignee: Caterpillar Global Mining Europe GmbH, Lünen (DE)

(*) Notice: Subject to any disclaimer, the term of this patent is extended or adjusted under 35 U.S.C. 154(b) by 0 days.

(21) Appl. No.: 14/383,528

(22) PCT Filed: Mar. 1, 2013

(86) PCT No.: PCT/EP2013/000634
§ 371 (c)(1),
(2) Date: Sep. 5, 2014

(87) PCT Pub. No.: WO2013/131636
PCT Pub. Date: Sep. 12, 2013

(65) Prior Publication Data
US 2015/0027858 A1    Jan. 29, 2015

(30) Foreign Application Priority Data
Mar. 5, 2012  (DE) .................... 20 2012 100 777 U

(51) Int. Cl.
*B65G 17/06*    (2006.01)
*E21F 13/06*    (2006.01)
(Continued)

(52) U.S. Cl.
CPC .......... *B65G 17/066* (2013.01); *B65G 17/065* (2013.01); *B65G 17/18* (2013.01); *B65G 47/965* (2013.01); *E21F 13/06* (2013.01)

(58) Field of Classification Search
CPC ..... B65G 17/065; B65G 17/066; B65G 47/38; B65G 17/18; E21F 13/06
See application file for complete search history.

(56) References Cited

U.S. PATENT DOCUMENTS 3,034,665 A    5/1962  Speaker
3,690,445 A *  9/1972  Ouska .................. B65G 17/067
                                                      198/822
(Continued)

FOREIGN PATENT DOCUMENTS

CN    2725227      9/2005
DE    914 478 C   7/1954
(Continued)

OTHER PUBLICATIONS

International Search Report from Application No. PCT/EP2013/000634; filed Mar. 1, 2013.

*Primary Examiner* — Thomas Randazzo

(57) ABSTRACT

The present disclosure relates to a slat conveyor for transporting material in mining and extraction systems. The slat conveyor may comprise a plurality of channel elements arranged in a series, a material-transport strand and an oppositely-moving return strand. The slat conveyor may further comprise an endless conveyor including a conveyor chain and a plurality of transport plates with a plate section, which may be pivotable downward in a delivery area for the transported material. Thus, for example, a flat-constructed slat conveyor (apron conveyor) having a low loading height may be provided.

24 Claims, 5 Drawing Sheets

(51) Int. Cl.
*B65G 17/18* (2006.01)
*B65G 47/96* (2006.01)

(56) References Cited

U.S. PATENT DOCUMENTS

| | | | | | |
|---|---|---|---|---|---|
| 3,985,251 | A | * | 10/1976 | Reilly | B65G 47/38 |
| | | | | | 414/800 |
| 4,140,213 | A | * | 2/1979 | Denison | B65G 47/5104 |
| | | | | | 198/358 |
| 4,241,824 | A | * | 12/1980 | Georg | B65G 19/08 |
| | | | | | 198/517 |
| 4,925,383 | A | | 5/1990 | Jidell | |
| 5,137,144 | A | * | 8/1992 | Uehara | B65G 17/10 |
| | | | | | 198/698 |
| 6,135,262 | A | * | 10/2000 | Polling | B65G 47/962 |
| | | | | | 198/370.04 |
| 6,152,280 | A | * | 11/2000 | Bruun | B65G 17/065 |
| | | | | | 198/370.04 |
| 6,231,293 | B1 | * | 5/2001 | Ostholt | B65G 17/002 |
| | | | | | 414/418 |
| 6,981,584 | B2 | * | 1/2006 | Grabmann | B65G 17/065 |
| | | | | | 198/850 |
| 9,045,290 | B2 | * | 6/2015 | De Greef | B07C 5/36 |
| 2013/0199898 | A1 | * | 8/2013 | Baier | B65G 19/287 |
| | | | | | 198/735.2 |
| 2013/0319826 | A1 | * | 12/2013 | Padberg | B65G 19/28 |
| | | | | | 198/728 |

FOREIGN PATENT DOCUMENTS

| | | | | | |
|---|---|---|---|---|---|
| DE | 1 583 039 | B1 | | 3/1971 | |
| DE | 19721201 | | * | 11/1998 | E21C 35/12 |
| FR | 374921 | | * | 4/1907 | B65G 17/18 |
| FR | 374 921 | A | | 6/1907 | |
| FR | 2 618 088 | A1 | | 1/1989 | |
| GB | 1081533 | | * | 8/1967 | E21F 17/04 |
| WO | 03/091 541 | A1 | | 11/2003 | |

* cited by examiner

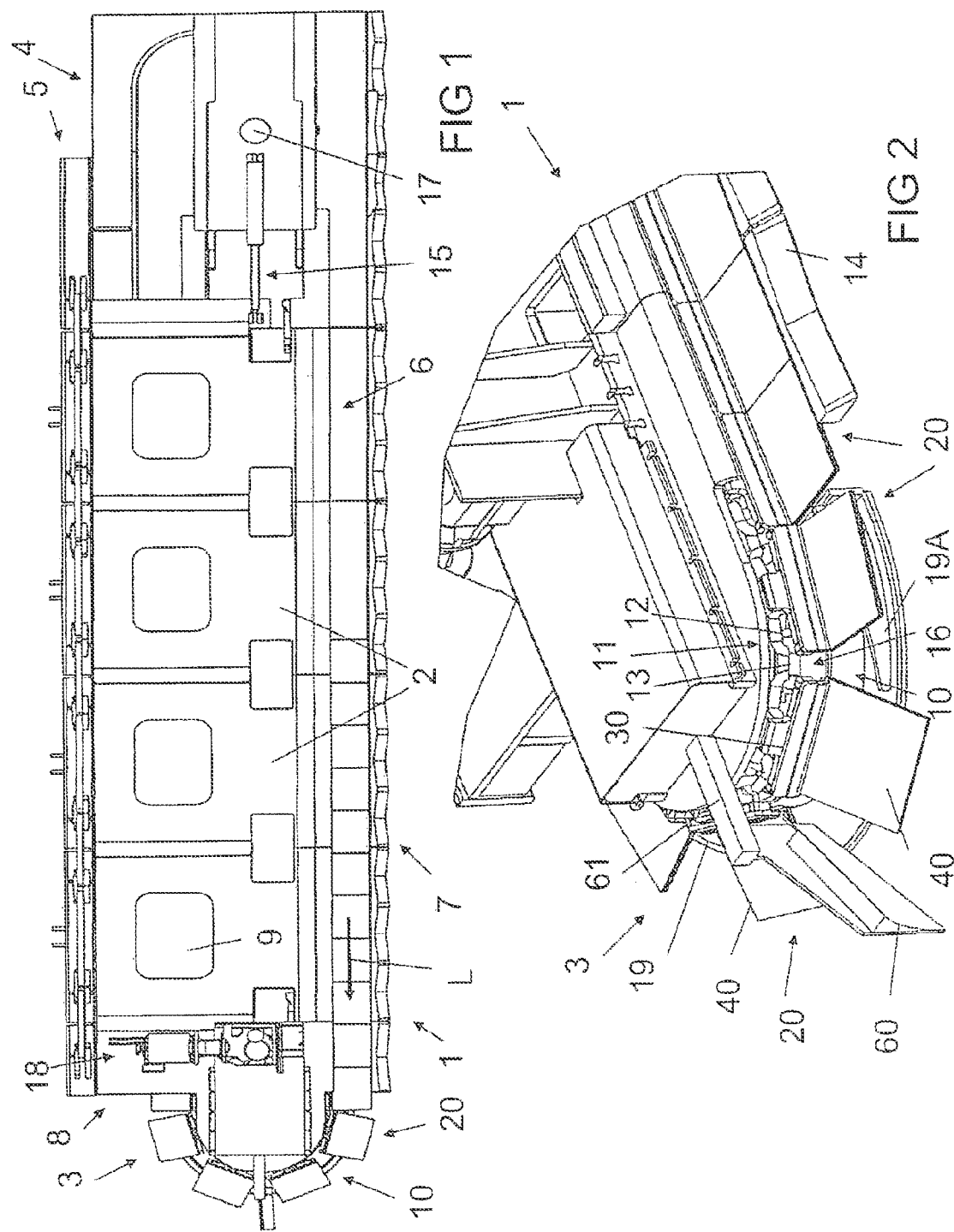

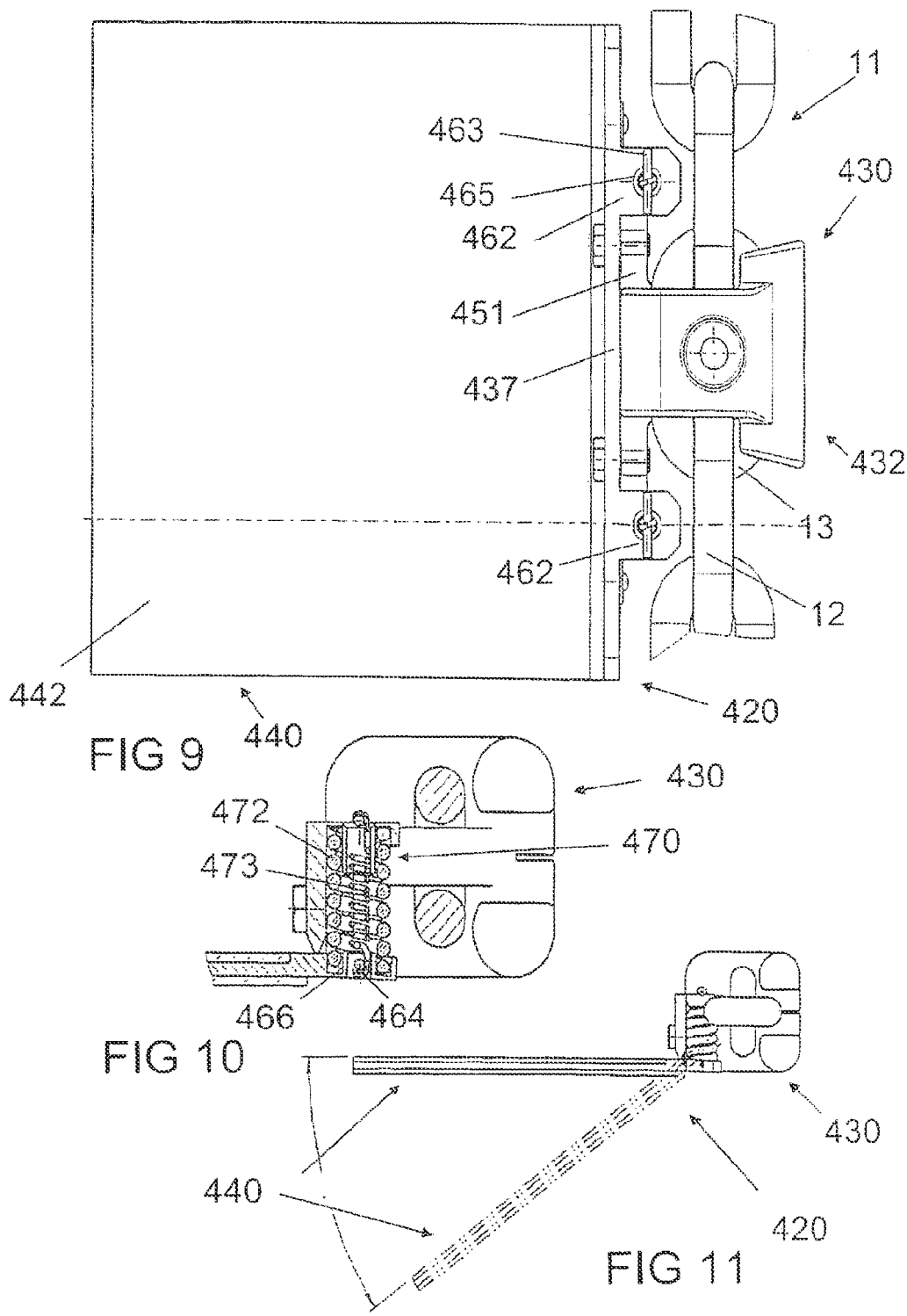

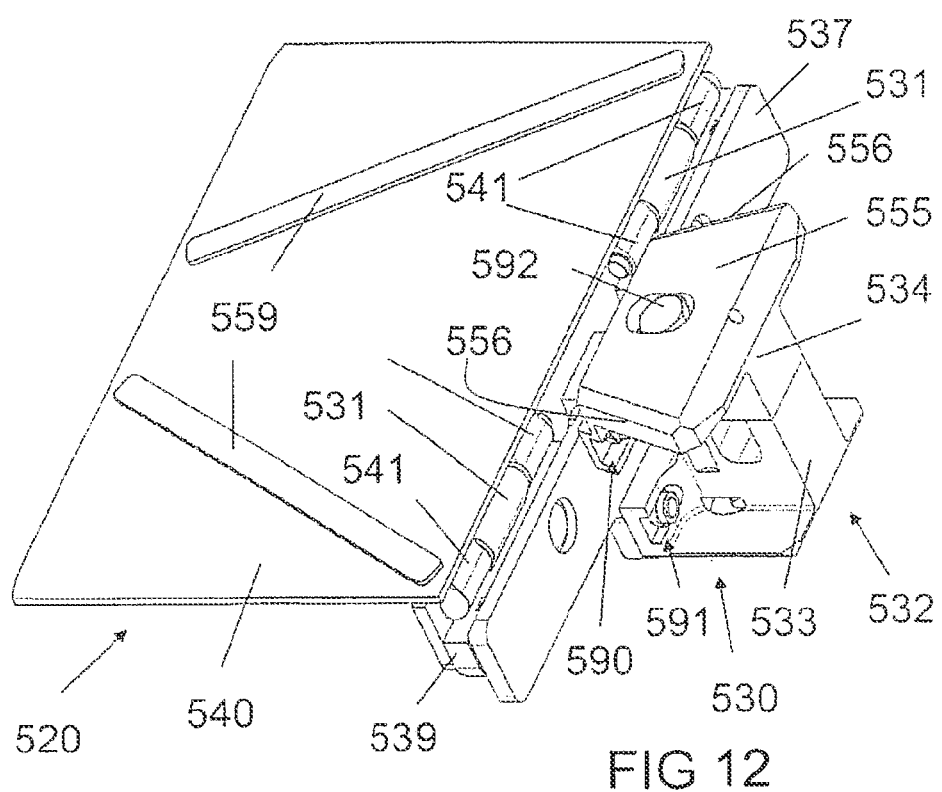

SLAT CONVEYOR FOR EXTRACTION SYSTEMS AND TRANSPORT PLATES THEREFOR

CROSS-REFERENCE TO RELATED APPLICATIONS

This application is a National Stage of International Patent Application No. PCT/EP2013/000634, filed Mar. 1, 2013, which claims priority to foreign German Patent Application No. 20 2012 100 777.0, filed Mar. 5, 2012, the contents of which are incorporated herein by reference in their entirety.

TECHNICAL FIELD

The present disclosure relates to a slat conveyor (apron conveyor) and transport plates for such a slat conveyor (slats), in particular for transporting materials in mining and extraction systems.

BACKGROUND

In underground mining, face conveyors having drive means attached to conveyor chains have been used for decades, in order to transport away material that has been extracted from the mined face using a mining machine, for example a shearer loader or a mining plow, and then drop the material onto a so-called roadway conveyor, which can include in particular a belt conveyor having circulating rubber belts.

For many purposes a chain scraper conveyor (armored face conveyor) may be used in such applications as a face conveyor, which is provided with superimposed channel sections, in which the conveyor chain having the connected scraper cross-bars circulates as the drive means. The upper channel section is called the "upper strand" and constitutes the material-transport strand, while the lower strand constitutes the return strand. The ends of the scrapers are usually guided on profiled side profiles of the channel element. A disadvantage of this design is that the excavated material from the mining machine must be transported to the upper material-transport strand, for which it has been proposed, e.g. in WO 03/091 541 A1, to attach a loading ramp to the mining-face-side sidewall of the channel element. The loading ramp is bent in its height direction.

Chain scraper conveyors are suitable in particular as face conveyors for mining facilities in longwall operations, in which face lengths of 100 to over 400 meters predominate and a wandering support, comprised of numerous roof support frames, is used. The roof supports (shield supports) stand adjacent to one another, in order to keep the working room behind a mining face open for the mining machines, and move either group-wise or in alternating advancement of the roof supports with the mining front as it is further eroded with each machine pass.

For special applications such as in shortwall mining, which is used for example for advancing the stable of machines (cf. DE 1 583 039), or when material should be conveyed (transported) with both strands (DE 914 478), it is known to arrange the two strands not over one another, but rather substantially adjacent to one another.

A slat conveyor has already been proposed in DE Patent No. 914 478 for very special applications, in which trough-like, partially overlapping plates having lateral upturned edges are moved in a circulating manner using a conveyor chain. In this embodiment, the plates themselves move on guide rollers on both sides of channel elements. The channel elements forming the material-transport strand and the channel elements forming the return strand can be disposed either adjacent to one another to achieve a particularly low conveyor height, or one over the other. The plates are situated obliquely at an unloading point, so that the material can slide off from the top side of the transport plate over an open end between the upturned edges. At the unloading station and at the opposite return station the carrier plates that form the transport plates must be swiveled (pivoted) out to the side in a relatively complex manner with respect to the conveyor chain and then situated obliquely. The slat conveyor only functions if the conveyor belt is moved by a sufficient height in the delivery area, where the channels guiding the support plates are raised using lifting supports.

The present disclosure is directed, at least in part, to improving or overcoming one or more aspects of prior systems.

SUMMARY OF THE DISCLOSURE

According to a first aspect, a slat conveyor for transporting material in mining and extraction systems may comprise a plurality of channel elements arranged in a series between two stations. Each station may accommodate a sprocket. The slat conveyor may further comprise a first strand constituting a material-transport strand and being guided in the plurality channel elements, and a second strand constituting a return strand oppositely-moving to the first strand and being guided in the plurality of channel elements. The slat conveyor may further comprise an endless conveyor including a conveyor chain and a plurality of transport plates. The endless conveyor may be adapted in operation to circulate between the two sprockets in the first strand and the second strand, the two sprockets being used to redirect the conveyor chain. The conveyor chain may be provided with a plurality of chain links, and the plurality of transport plates may be connected to the plurality of chain links of the conveyor chain. The transport plates may each include a chain connector part and a plate part. The plate part may be connected to the chain connector part such that at least a movable plate section of the plate part may be moveable relative to the chain connector part. The movable plate section of the plate part may be pivotable downward relative to the chain connector part in a delivery area for the transported material along the running direction of the conveyor chain.

According to another aspect, a transport plate for a slat conveyor in particular as exemplary disclosed herein for transporting material in mining and extraction systems, may comprise a connector part for attaching the transport plate to a chain link of a conveyor chain, and a plate part. The plate part may be connected to the chain connector part such that at least a plate section of the plate part is moveable relative to the chain connector part. The plate section may be pivotable or foldable downwards relative to the chain connector part in a delivery area for the to-be-transported material.

Other features and aspects of this disclosure will be apparent from the following description and the accompanying drawings.

BRIEF DESCRIPTION OF THE DRAWINGS

FIG. 1 shows a plan (top) view of a slat conveyor according to a preferred design;

FIG. 2 shows a perspective view of the delivery station of the slat conveyor from FIG. 1;

FIG. 9 shows a perspective view of a transport plate according to a fourth exemplary embodiment, with chain links indicated;

FIG. 10 shows the chain connector part in a vertical view and a partial cross-section of the plate part in the transport plate according to FIG. 10;

FIG. 11 shows a side view of the transport plate from FIG. 9 in which the transport plate is pivoted downward; and FIG. 12 shows a perspective view of a transport plate according to a fifth exemplary embodiment as viewed from the bottom side.

DETAILED DESCRIPTION

Figure 3:
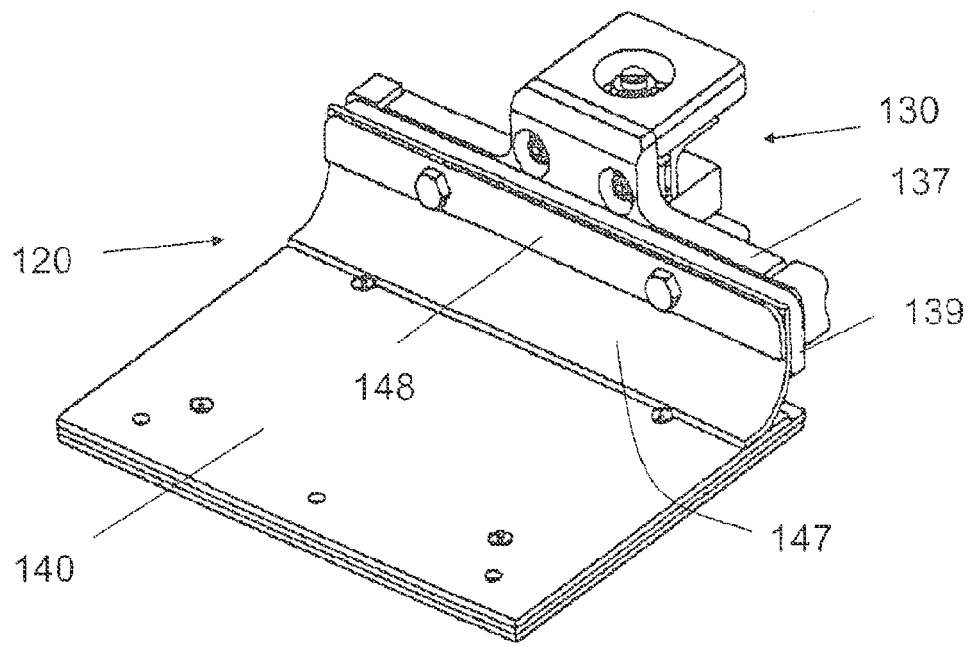
FIG. 3 shows a perspective view of a transport plate according to a first exemplary embodiment.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

A slat conveyor according to the present disclosure is indicated schematically simplified in its entirety in FIG. 1 with reference number 1. In this exemplary embodiment, the slat conveyor (apron conveyor) 1 comprises a plurality of channel elements 2, for example, four channel elements 2 as shown in FIG. 1, constructed identically to one another. The four channel elements 2 are preferably connected, so as to resist separation when a tensile force is applied and preferably in a way that restricts angular movement, in a row between a delivery (material drop off) station 3 and a return station 4. By inserting additional channel elements 2, the length of the slat conveyor 1 could be lengthened to lengths of, for example, 50 meters and more. A not-illustrated mining machine can move along the slat conveyor 1, for which purpose a lantern gear is provided on the upper, rear side in FIG. 1, often referred to in mining as the goaf side. A further machine roadway 6 is provided on the lower side facing towards the material face to be mined. The mining machines can be supported and guided on the machine roadway 6.

The slat conveyor 1 has a conveyor, indicated in its entirety with reference number 10, for transporting materials mined (excavated or extracted) using the mining machines at the mining face. As can be clearly seen in particular also from FIG. 2, the conveyor 10 (endless conveyor) comprises a plurality of transport plates 20 and a conveyor chain 11, which is composed of a plurality of chain links, namely inter-engaged, alternating vertical chain links 12 and horizontal chain links 13. The transport plates 20 are connected to the conveyor chain 11 at regular intervals. By using the transport plates 20, mined material can be transported as excavated material to a delivery area formed by the delivery station 3, as will be further explained below, and then transferred to another transport means.

The conveyor 10 having the connected transport plates 20 circulates in the slat conveyor 1 in running direction L in two so-called strands (first strand and second strand), namely on the mining-face side in a material-transport strand 7, on which the transport plates 20, as can be clearly seen from FIGS. 1 and 2, are open at the top and to the extent possible are not covered by the channel elements 2, and on the goaf side in a return strand 8, wherein the return strand 8 is fully covered by parts of the channel elements 2. However, the return strand 8 is accessible using removable inspection plates 9. The material-transport strand 7 of the conveyor 10 is, as clearly shown in FIG. 2, terminally bordered on the mining face side only by a ramp (apron) 14 that are flush with the upper sides of the transport plates 20, such that excavated material can be pushed onto the transport plates 20 via the ramps 14.

The first strand constituting the material-transport strand 7 and the second strand constituting the return strand 8 oppositely-moving to the first strand are each guided in channel sections in the plurality of channel elements (2).

In order to balance chain tensions and in particular a suspension chain, the return station 4 is equipped with a tensioning apparatus 15, which comprises a hydraulic cylinder in this embodiment. The spacing between a first sprocket 16 in the delivery station 3 and a second sprocket in the return station 4, which is only indicated by its pivot pin 17, is changeable by extending and retracting the hydraulic cylinder. The sprocket 16 in the drive station 3 can be driven by a drive motor 18, in order to enable the conveyor 10 of the slat conveyor 1 to circulate in the running direction L, and thereby move the individual transport plates 20 in a circulating manner through the material-transport strand 7, the delivery station 3, the return strand 8, and the return station 4.

In the slat conveyor 1, one side of each transport plate 1 includes a chain connector part 30 connected to a horizontal chain link 13, and the other side includes a plate part 40. The chain connector part 30 and the plate part 40 are connected to each other such that, as FIG. 2 especially clearly shows on the transport plates 20 in the region of the sprocket 16, the plate part 40 can fold or pivot downwards in the delivery (drop off) area formed by the delivery station 3, while the transport plates 20 are returned 180° in the return strand by the associated sprocket 16. Through this preferably abrupt folding (pivoting) of the plate part from a horizontal or bed-parallel position into an oblique (tilted) position, any excavated material lying on the plate part 40 of the transport plate 20 can be transferred to (dropped onto) a deeper-lying conveyor or the like.

In order to raise a downwardly-pivoted plate part 40, as shown in FIG. 2, back to ground level in the return strand in the exit region of the delivery area 3, a guide means 19 such as a suitable rail is disposed in the exit region. In FIG. 2, the guide means 19 is located on the rear side of the slat conveyor 1, such that the plate part 40 of a transport plate 20 is raised up again, relative to the running direction, at a specific-reached arc angle on the sprocket 16, in order to return again to the horizontal or bed-parallel position before arriving at the return strand.

A guide means 19A is also disposed in the exit region. The guide means 19A serves on the one hand to raise the transport plates 20 to the level of the conveyor despite movement of the conveyor 10 contrary to the usual running direction, and serves on the other hand to support the plate part 40 such that only upon exceeding a certain arc angle, it folds (pivots) down as abruptly as possible, in order to promote (cause) the material moved using the plate part 40 to slide off. In addition, any material still remaining on the top side of the plate part 40 can be scraped away using a scraper 60.

Moreover, a gas or liquid stream can be directed onto the top side of the plate part 40 via a spraying system 61—which is only very schematically disposed and whose nozzles are not individually shown—in order to additionally blow off inadvertently-remaining material using the fluid stream. The spraying system 61 can also be used without a scraper.

Figure 4:
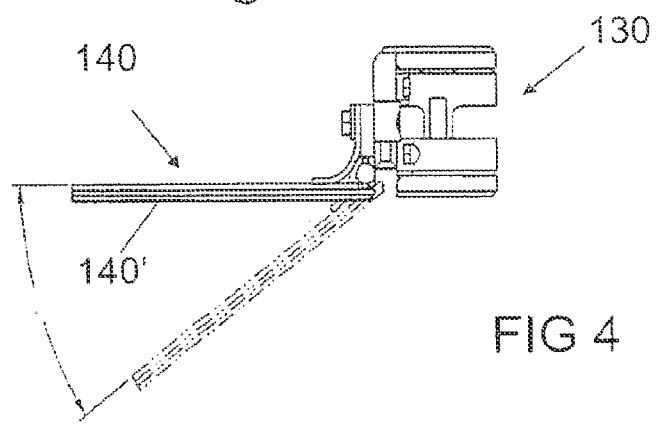
FIG. 4 shows a side view of the transport plate from FIG. 3 in which a plate part is pivoted (folded) downward.
Figure 6:
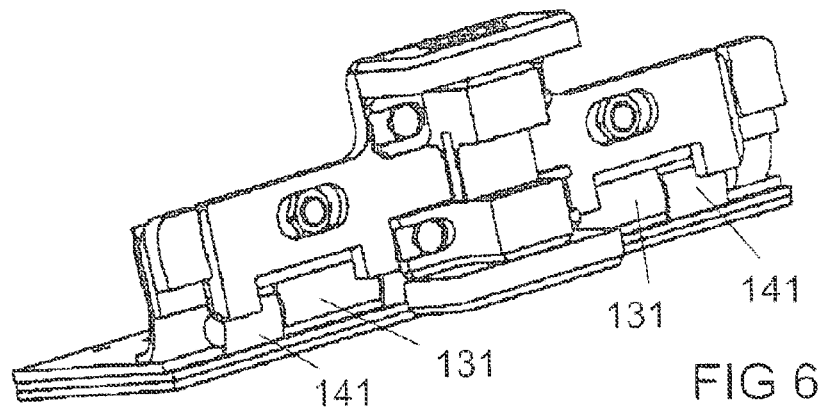
FIG. 6 shows a rear view of the transport plate from FIG. 3.

Reference is now made to the FIGS. 3 to 6, in which a first exemplary embodiment of a transport plate 120 is illustrated in detail. In the transport plate 120, the chain connector part 130 and the plate part 140 are connected with each other via a first hinge assembly 141, which is disposed on the side of the plate part 140, and a second hinge assembly 131, which is disposed on the side of the chain connector part 131. In total, two pairs of hinge assemblies 131, 141 are disposed in a distributed manner over the length of the transport plate 120. The entire plate part 140 forms a movable plate section on the transport plate 120. Due to the hinge-like connection of the chain connector part 130 and the plate part 140, the plate part 140 can, as FIG. 4 shows particularly well, pivot unhindered between a substantially horizontal position and a downwardly angled position, provided that the underside 140' of the plate part 140 is not supported or hindered.

Figure 5:
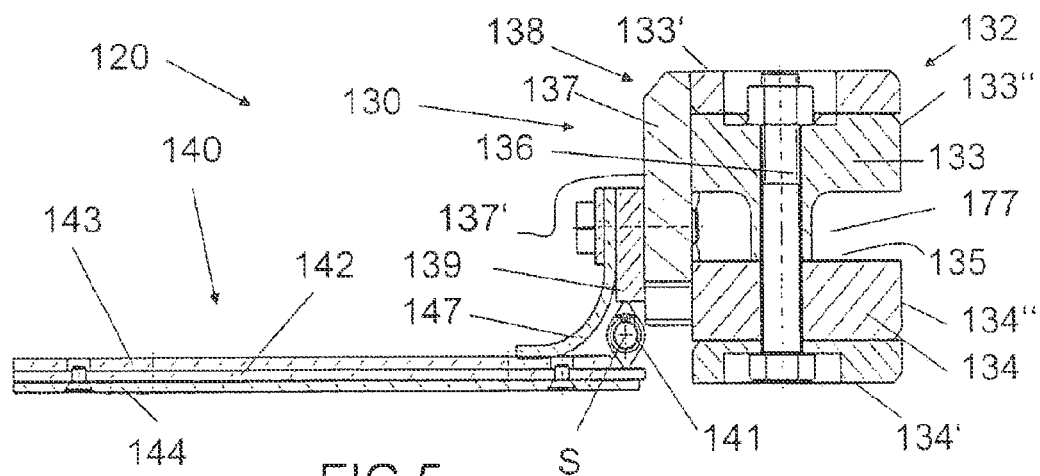
FIG. 5 shows a side view of the transport plate from FIG. 3 in cross-section.

As can be seen clearly from FIG. 5, the plate part 140 is formed in a multi-part or "sandwiched" manner and comprises a middle plate 142, on which multiple belt parts of the hinge assembly 141 are welded so as to be aligned with the pivot axis S. Each two belt parts of the hinge assembly 141 with one belt part of the hinge assembly 131 positioned therebetween form, with a bolt extending therethrough, a pivot hinge.

The upper side of the plate part 140 is provided with a strong wear layer 143. A base plate 144 is removably screw fastened underneath the middle plate 142. While the top layer 143 provides wear protection, it also preferably serves to improve the sliding off of the excavated material when the plate part 140 is positioned obliquely. For this purpose, the top layer 143 preferably consists of a suitable plastic having adhesion-minimizing properties. The base plate 144 also serves as a wear protection and also should have enhanced sliding properties, since the base plate 144 lies on a not-further-shown channel base of the channel element over the entire length of the haulage (material transport) strand, and also of the return strand. Due to the excavated material lying on the plate part 140, a higher amount of wear can occur on the underside of the transport plate 120 in particular in the haulage strand. The exchangeability of the base plate 144 using the screw connections facilitates a replacement of the most stressed areas on the plate part 140 of each transport plate 120.

The chain connector part 130 is constructed in a multipart manner and has in particular a very strong (rigid) chain block 132, which has a substantially rectangular base form with an upper block part 133 and a lower block part 134, which are detachably connected to one another relative to a horizontal partitioning plane 135 by a central screw 136. The recesses 177 on the underside of the upper block part 133 that can be clearly seen in FIG. 5 serve to accommodate (receive) a horizontal chain link in a manner that resists separation when a tensile force is applied. The horizontal chain link can be inserted between the two detachable block parts 133, 134.

The upper side 133' of the upper block part 133 forms a guide surface, which is parallel to and opposite of another guide surface 134' located on the underside of the lower block part 134. A further guide surface is formed by the rear sides 133", 134" of the block parts 133, 134 of the chain block 132. A fourth guide surface 137' is disposed opposite of the rear sides 133", 134" and is formed by the front side of a head plate (face plate) 137, which is detachably screwed via screw connections onto the upper block part 133 as well as onto the lower block part 134, thereby providing an additional reinforcement (stiffening) of the multipart chain block 132. The upper corner of the head plate 137 is provided with a bevel 138, with which the chain block 132 can additionally guide itself on an opposing bevel within the chain channel in the channel elements of the slat conveyor.

In the depicted exemplary embodiment, the chain-block-side hinge assemblies 131 are welded to the lower transverse edge of a bar 139, which is detachably screwed onto the head plate 137. Both the bar 139 and the head plate 137 extend, as is clearly shown in FIG. 3, over the entire length of the transport plate 120 in the running direction. A sealing lip 147 is fastened to the head plate 137 in front of the bar 139 using a retaining bar 148, which borders the excavated-material-receiving plate section of the plate part 140 of the transport plate 120 on the chain channel side, both in the normal state, as shown in FIG. 5, and in the folded-down state, as indicated in FIG. 4. At the same time, the sealing lip 147 covers the hinge assemblies 131, 141 and, independent of the folding state, prevents large chunks of material from hindering the pivoting movement, in particular the return pivoting movement of the plate part.

Figure 7:
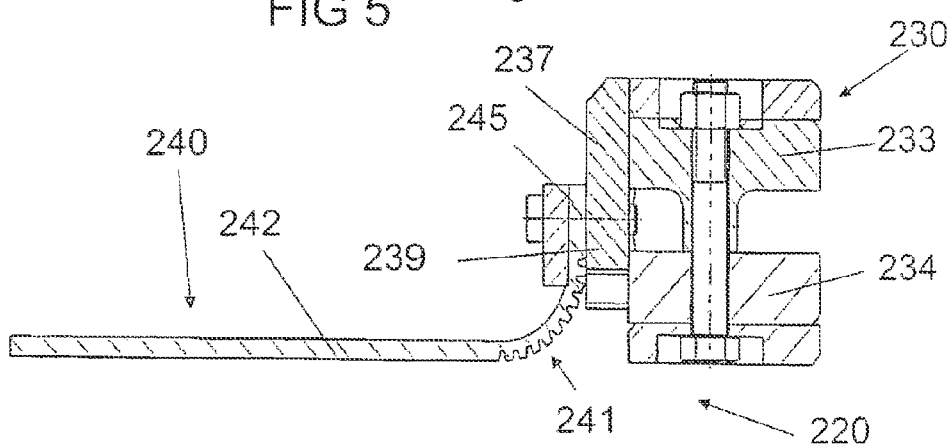
FIG. 7 shows a side view of a transport plate in cross-section according to a second exemplary embodiment.

FIG. 7 shows a second exemplary embodiment of a transport plate 220 according to the present disclosure. The chain connector part 230 has virtually the same structure as in the previous exemplary embodiment, in which a chain block 232 includes an upper chain block 233 and lower chain block 234 for accommodating a horizontal chain link in a manner that resists separation when a tensile force is applied. A detachable head plate 237 is screwed onto the mining-face side of both block parts 233, 234 and additionally connects them together. The plate part 240 has or integrally forms a first plate section 242, on which the material is deposited and transported, a second plate section 245 integrally formed on the plate part 240, which is fixedly screwed onto the head plate 237 using a bar 239, and a hinge section 241, which is formed as a film hinge or integral hinge in this embodiment.

To form the film (integral) hinge, longitudinal grooves are formed in (machined or cut into) the outer (lower) side of the plate part 240. The longitudinal grooves weaken the otherwise rigid plate part 240 in the region of the hinge section 241 such that the plate section 242 can be bent by approximately 90° relative to the second plate section 245. The entire plate part 240 preferably consists of a suitable plastic plate material having reasonably good sliding properties with adequate wear protection, adequate tensile strength and adequate flexibility in the area of the hinge section 241. The plate part 240 can also be constructed with a "sandwich" design; in this case a coating having adherent-reducing additives can be formed or deposited on the top layer and a coating having wear protection can be formed or deposited on the underside. The hinge section 241 could be formed in different ways in order to form a film hinge or integrated hinge.

Figure 8:
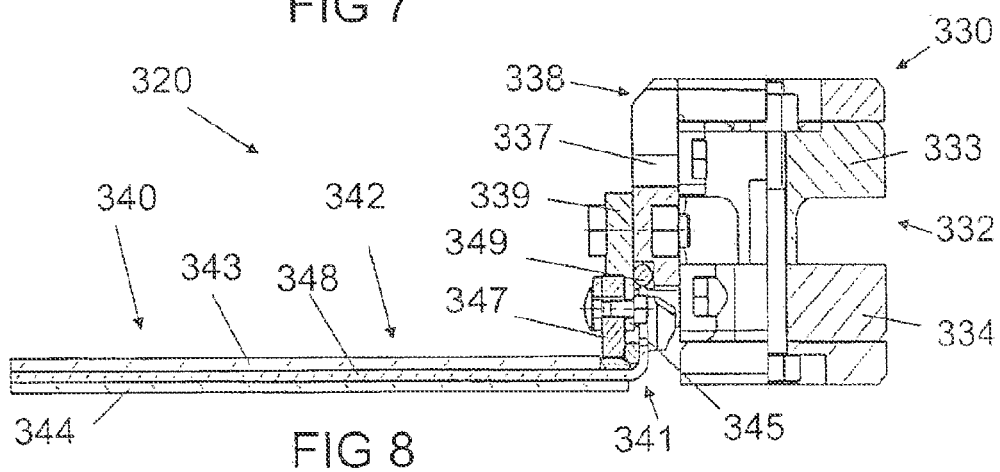
FIG. 8 shows a side view of a transport plate in cross-section according to a third exemplary embodiment.

FIG. 8 shows a third exemplary embodiment of a transport plate 320 having a chain connector part 330 and a plate part 340 that is movably connected therewith and foldable (pivotable) downwards. As in the previous exemplary embodiment, the transport plate 320 includes a hinge section 341 that is also integrated into the plate part 340. The hinge section 341 is disposed between a first plate section 342, on which the excavated material is transported and which is movable (pivotable) relative to the connector part 330, and a second plate section 345, which is clamped in a recess located underneath the head plate 337 using a clamping bar 339. In the depicted exemplary embodiment, the terminal longitudinal edge of the second plate section 345 is provided with a clampable strip 349, which is clamped between the bar 339 and head rail 337. As in the previous exemplary embodiments, the chain connector part 330 also includes a chain block 332 having a block upper part 333 and a block lower part 334, which in FIG. 8 are only partially shown in section, wherein the screw connections between the head plate 337 and the block parts 333, 334 are also visible.

The plate part 340 is preferably designed in a "sandwich" form, wherein only a middle layer 348 made from a suitable material forms the hinge section 341 and the second plate section 345. In the first plate section 342 both a top layer 343 and a bottom layer 344 having the respective desired properties are attached to the middle layer 348. Since the middle layer 348 is only required to provide that the longitudinal forces are transmitted via the chain connector part 330 into the plate part 340, and to support the weight of the plate part 340 during the folding-back (return), a wide variety of possible structures may be utilized for the design of the middle layer 348.

In the exemplary embodiment shown in FIG. 8, the second plate sections 345 extend only partially over the length of the plate part 340. In order to prevent material from penetrating into the chain channel or into the folding region in this design, a sealing strip 347 is additionally screwed onto the bar 339, which is in turn fixedly connected with the head plate 337. In addition to the respective guide surfaces, the head plate 337 also has a bevel 338 adapted to cooperate with an opposing bevel on the channel elements of the slat conveyor.

FIGS. 9 to 11 show a third exemplary embodiment of a transport plate 420 with only a greatly simplified illustrated chain connector part 430, which is connected to a horizontal chain link 13 of the conveyor chain 11. The chain connector part 430 here preferably consists of a one-piece chain block 432, in which the tensile and shear forces are applied by the end sides of the bends of the vertical chain links 12. A transverse strip 451 is formed on the chain block 432. A head rail 437 is screwed onto the chain block 432 and extends over the entire length of the transport plate 420.

The rear side of the head rail 437 has two rearwardly-projecting connection lugs 462, which are positioned such that they project into the gap between two horizontal chain links 13. Both lugs 462 have a hole 465, in which a spring assembly 470 is disposed. The upper end of a coil spring 473 of each spring assembly 470 is fastened to each respective lug 462 using a transverse pin 463. The coil spring 473 extends through the interior of an outer, stronger coil spring 472, the upper end of which abuts against the underside of the lug 462 and can support it there. While the outer coil spring 472 pushes in the rear region from above against the rear plate section of the plate part 440, for which recesses can also optionally be formed in the region of the rear longitudinal edge of the plate section 440, the inner coil spring 473 is anchored in openings 466 in the transport plate 440 using a second transverse pin 464.

The inner coil spring 473 ensures a pivotable suspension of the plate part 440 on the chain connector part 430 and in this respect also ensures the vertical pivotal mobility between the chain connector part 430 and the plate part 440. For this purpose a large tensile force is applied to ensure adequate biasing, so that the plate part 440 can substantially pivot about the lower transverse pin 464 while maintaining the same height position in the rear longitudinal area of the plate part 440.

When the transport plate 420 enters into the delivery area and is no longer supported from below by guides, the weight of the excavated material disposed on the loaded plate section of the plate part 440 causes the plate part 440 to pivot downward. However, a return force is applied by the outer spring 472 of the spring assembly 470, which counteracts (urges against) the folding down movement after the excavated material has slid downwards off of the plate part 440. By utilizing two different springs 472, 473, on the one hand a good pivotability and on the other hand also a smooth return movement can be achieved.

The transport plate 520 shown in FIG. 12 includes, similar to the exemplary embodiment according to FIGS. 3-6, hinge assemblies having hinge belt parts 541 disposed on the rear edge of the plate part 540 of the transport plate 520. A chain-connector-part-side hinge belt part 531 is connected to a head rail 537 via a bar 539. The head rail 537 is connected with both block parts 533, 534 of the chain connector part 530.

As is readily apparent from FIG. 12, the head rail 537 is connected to the lower block part 534 via first screw connections 590 and also to the upper block part 530 via second screw connections 591. The two block parts 533, 534 are also connected to one another via a further screw 592.

The lower block part 534 has a strong (rigid) base plate 555, whose transverse edges 556 are oriented transversely to the running direction and extend from the rear side of the chain block 532 in a V shape obliquely towards one another to the head plate 537. Therefore, a sweeping effect may be achieved, which causes any material that has inadvertently penetrated into the chain channel of the channel element, in which the block part 543 is guided without twisting, to be pushed away forward.

A similar sweeping effect may also achieved using glide strips 559, which are disposed on the underside of the plate part 540 in an orientation oblique to the running direction. The plate part 540 lays on the glide strips 559 within the strands on the channel bottom of the channel element. The V-shaped oblique arrangement of the glide strips 559 achieves a sweeping effect, which causes any material on the bottom of the channel elements to be transported outward, and even if the running direction is changed or the conveyor is briefly moved in the opposite direction, in order for example to free a blockage.

The two glide strips 559 are preferably adequately spaced from each other at the terminal edge of the plate part 540, so that no material can collect in the gap between the two glide strips 559. In order to improve the sweeping effect, the front sides of the glide strips 559 are preferably designed to be sharp-edged.

The wear on the plate part 540 of the transport plate 520 can be reduced by utilizing narrow glide strips 559. The significantly reduced contact area, which is achieved using narrow glide strips 559, and the simultaneous increased surface pressure between the glide strips 559 and the channel bottom are of additional advantage, since this additionally improves a self-cleaning function of the conveyor line pan despite the foldability of the plate part 540.

In the folded-down position of the plate part 540, the excavated material can slide down well due to the abrupt slope, wherein an additional impulse can optionally be generated through an impact effected by the guiding means, in order to dislodge the transported material. In all exemplary embodiments the movable plate section is formed flat or level and without lateral elevations on at least three sides.

INDUSTRIAL APPLICABILITY

According to one aspect of the present disclosure, a particularly flat-constructed slat conveyor (apron conveyor), which may have a low loading height is provided.

In such a slat conveyor, the transport plates may include a chain connector part and a plate part connected to the chain connector part such that at least a plate section of the plate part may be moveable relative to the chain connector part. The plate section may be pivotable or foldable downwards relative to the chain connector, with reference to the running direction of the conveyor chain, in a delivery area for the to-be-transported material. Due to the pivotability of the movable plate section transporting the material, e.g., excavated material, the conveyor chain can move in any desired position, even virtually at ground level, since the movable plate section folds exclusively downward, while the chain connection section circulates in the groove or on the sprocket in a consistent position and is uninfluenced by the tilting plate section of the transport plate. This also reduces the burden on both the chain connector part and the respective sprocket.

According to a particularly advantageous embodiment, a guide means for the movable plate section may be disposed in the delivery area, with which guide means the plate section can be returned upwards in the exit region of the delivery area. It is particularly advantageous if the guide means may extend in the entry and exit regions of the delivery area and may permit an abrupt downward folding (downward pivoting) of the plate section on the entry side. The abrupt folding of the plate section, on which the transported material—usually excavated material—lies, may improve the delivery (dropping off) of the transported material in the delivery area, and may prevent large amounts of material from remaining lying or stuck on the top side of the preferably flat plate section.

In principle, the delivery area could also be disposed in the longitudinal portion of the material-transport strand or of the return strand. In mining and extraction systems, however, one of the stations is usually formed as a delivery (drop off) station, which thus forms the delivery (drop off) area, wherein the guide means may be preferably disposed such that a return- or upward-pivoting of the movable plate section is concluded before the chain connector part of the transport plate would be redirected by 180° by the sprocket. It is further advantageous if one of the stations may be provided with a tensioning apparatus to change the spacing of the sprockets. Especially in such an embodiment, it may be expedient to use a sprocket that is modifiable using the tensioning apparatus as a pure idler, while the sprocket that may be preferably disposed in the delivery station forms the motor-driven sprocket for moving the conveyor means, for example, the conveyor chain and transport plates.

In order to prevent materials from adhering to the top side of the transport plate, a spraying system having at least one nozzle for directing a jet of gas or liquid against a top side of the movable plate section of the transport plate can be disposed in the delivery area.

The aforementioned object may be also achieved in particular by a transport plate for a slat conveyor for transporting materials in mining and extraction systems, wherein the transport plate may include a plate part, which is connected to the chain connector part. The plate part may be connected to the chain connector part such that at least a plate section of the plate part is moveable relative to the chain connector part. The plate section may be pivotable downwards relative to the chain connector part, preferably about a horizontal axis, in a delivery (drop off) area for the transported materials. The design of the transport plates having a plate section, which may be pivotable relative to a chain connector part, may be particularly advantageous if the chain connector part, or a plate section fixedly connected thereto, laterally borders a longitudinal side oriented in the longitudinal direction of an otherwise substantially flat plate part or plate section for transporting the excavated material. The movable plate section may be consequently movably hinged (coupled) on one side to the chain connector part, so that the entire movable plate section, or the entire plate part, can be pivoted or tilted downward, normally about a horizontal axis.

According to an embodiment of such a transport plate for slat conveyors, the plate part between the movable plate section and a plate section fixedly screwed or clamped to the chain connector part can include a hinge section integrated in the plate part. Such a solution can for example be achieved by forming the hinge section as a film hinge (integrated hinge). For this purpose the entire transport plate can, for example, consist of an appropriate plastic material having sufficient toughness, wherein such a film hinge is formed by longitudinal grooves that partially weaken the hinge section, and are preferably disposed on the underside of the hinge section. In particular in a "sandwich" construction of the transport plate, the film hinge can also comprise a middle layer having appropriate flexibility, which is exposed in the area of the hinge section that is opposite of coatings or cover plates, which in particular may rigidly brace (reinforce) the plate section that moves and serves for the material transport.

According to an alternative embodiment of a transport plate for a slat conveyor, the movable plate part or plate section can be provided with a first hinge assembly, and the chain connector part or a plate section, which is fixedly screwed onto the chain connector part, can be provided with a second hinge assembly for a hinged (pivotable) connection of the plate part or plate section and the chain connector part using the hinge assembly. In this embodiment it is particularly advantageous if a sealing lip is provided, which may cover or overlap the hinge assembly and preferably extends in the running direction over the (entire) length of the transport plate. A sealing lip having such a design may not only protect the hinge assemblies from penetration of contaminants, and in particular excavated material, but may also prevents material from entering into a chain channel within the channel elements in the material-transport strand during transport, which could lead to a blockage of the conveyor chain within the chain canal.

According to a further embodiment, a spring assembly, in particular a return apparatus for the movable plate section, which return apparatus in particular biases (urges) one of the plate part or plate section in a horizontal direction, can be disposed between the movable plate part or plate section and the chain connector part. The spring assembly preferably may comprise a plurality of springs, wherein a first spring has a first end fastened to the plate part and a second end fastened to the chain connector part. The first spring may effect the movable connection between plate part and chain connector part, while a second spring may be disposed between these parts and may generate a return force upon downward folding (pivoting) of the plate part.

For all embodiments of the transport plates or their slat conveyors, it may be particularly advantageous if the chain connector may be formed as a chain block substantially having a preferably rectangular outer surface. The chain block may have a plurality of guide surfaces which are angularly offset to one another and lie parallel to the running direction, and with which the chain block is guidable, preferably without twisting, in a chain channel of the channel element.

According to a preferred embodiment, the chain connector part can be formed as a multiple-part chain block, having at least two block parts which are connectable to one another at a horizontally-extending partition plane. The chain block may be adapted to accommodate (receive) a horizontal chain link of the conveyor chain between the block parts so as to resist separation when a tensile force is applied. The entire transport plate can then be detached from the conveyor chain by disengaging (separating) the two block halves from one another. In such a design it may be especially advantageous if the lower block part includes a base plate having lateral edges that are oblique to the running direction. The base plate then normally forms one of the guide surfaces, with which the chain block is supported from below on a base of the channel element. Furthermore, the lateral edges may serve as a type of clearing blade that pushes any material, which has entered the chain channel, out of the chain channel.

In the embodiment having two chain block parts, it may be particularly advantageous if the chain blocks may be provided with threaded screw holes on the plate part side for a detachable fastening of a head plate (face plate) that overlaps the partition plane. Depending on the embodiment of the transport plate, a plate section or a hinge assembly may be fastenable or fastened onto the head plate. The head plate may preferably extend over the (entire) length of the transport plate, in order on the one hand to also thereby protect the chain channel from penetration of chunks of material, and also to be able to dispose the hinge assembly or the hinge section over nearly the entire length of the transport plate in the running direction. In a head plate that engages the two block parts, it may be additionally ensured that the load on a connection screw or the like for the connection of the two block parts to one another is reduced (relieved) during operation.

In order to improve the delivery (dropping off) of the transported material in the delivery area, it may be particularly advantageous if the plate section may have an upper side that is comprised of a plastic material, preferably having suitable adhesion-minimizing properties, or which is comprised of a wear-protective plastic layer or an attached plastic plate. In addition to a reduced adhesion, the coating of the upper side can also form a wear-protection for the movable plate section, over which the previously transported, highly abrasive material slides off in the delivery area.

As was already stated above, the plate part can be constructed in a "sandwich" design, especially in an embodiment having a film hinge. But even in a construction with a folding (pivotable) hinge, an increase of the service life can be achieved by a "sandwich" construction with, for example, screwed-on top and lower plates. Since the undersides of the transport plates slide along on the channel bottom of the strands, at least the underside of the movable plate section should be provided with a wear layer or sliding plate. Instead of a sliding plate, glide strips can be attached to the underside, for example in an oblique orientation to the running direction, preferably in a V-shaped or wedge-shaped arrangement, in order to push away the material lying on the channel floor of the strand transversely to the running direction and out of the channel elements.

For persons of skill in the art, numerous modifications will be apparent from the preceding description and are intended to fall within the scope of protection of the appended claims.

For example, it should be understood that the guide means can be attached in various ways.

The different exemplary embodiments depict possible designs of the respective transport plates.

As explained in the description of the Figures, additional coatings can be applied and the plates can be made from various materials.

The chain block also, in particular also in the multipart or "sandwich" design, can be provided with coatings as wear protection and/or for friction reduction, in particular on the underside and/or rear side. All coatings also may ensure an improved corrosion protection.

Slide or wear strips or the like can also be attached to the underside instead of coatings, which slide or wear strips optionally form the only contact surface with the channel element.

The present disclosure is therefore not limited to the designs according to the exemplary embodiments, which only serve to explain the inventive concept. The same applies to the design of the hinge section within the transport plates. Such and other modifications are intended fall within the scope of protection of the appended claims, and the exemplary embodiment serves only to illustrate the present disclosure, without limiting the scope of protection thereto.

Although the preferred embodiments of this invention have been described herein, improvements and modifications may be incorporated without departing from the scope of the following claims.

We claim:

1. A slat conveyor for transporting material in mining and extraction systems, the slat conveyor comprising:
    a plurality of channel elements arranged in a series between two stations, each station accommodating a sprocket;
    a first strand constituting a material-transport strand and being guided in the plurality channel elements;
    a second strand constituting a return strand oppositely-moving to the first strand and being guided in the plurality of channel elements;
    an endless conveyor including a conveyor chain and a plurality of transport plates, the endless conveyor being adapted in operation to circulate between the two sprockets in the first strand and the second strand, the two sprockets being used to redirect the conveyor chain,
    wherein the conveyor chain is provided with a plurality of chain links and the plurality of transport plates are connected to the plurality of chain links of the conveyor chain, the transport plates each including a chain connector part and a plate part connected to the chain connector part such that at least a movable plate section of the plate part is moveable relative to the chain connector part, the movable plate section of the plate part being pivotable downward relative to the chain connector part in a delivery area for the transported material along the running direction of the conveyor chain.

2. The slat conveyor according to claim 1, wherein one of the stations is provided with a tensioning apparatus for changing the spacing of the sprockets.

3. The slat conveyor according to claim 1, wherein a spraying system having at least one nozzle for directing a jet of gas or liquid against a top side of the movable plate section of the plate part is disposed in the delivery area.

4. The slat conveyor according to claim 1, wherein the channel elements are connected in a manner that resists separation when a tensile force is applied and/or that restricts relative angular movement.

5. The slat conveyor according to claim 1, wherein the chain connector part or a plate section of the plate part, which is fixedly connected to the chain connector part, laterally borders a longitudinal side oriented in the running direction.

6. The slat conveyor according to claim 1, wherein the plate part has a hinge section integrated in the plate part between the movable plate section and a plate section fixedly screw fastened or clamped to the chain connector part.

7. The slat conveyor according to claim 1, wherein a spring assembly having a plurality of springs is disposed between the movable plate section or plate part and the chain connector part, wherein a first spring effects the movable connection between plate part and chain connector part and a second spring forms a return apparatus such that one of its ends abuts the plate part and its other end abuts the chain connector part.

8. The slat conveyor according to claim 1, wherein the chain connector part is formed as a chain block having a substantially rectangular outer surface, the chain block being formed with a plurality of guide surfaces that are angularly offset relative to one another and lie parallel to the running direction, and with which the chain block is guidable, without twisting, in a chain channel of the channel element.

9. The slat conveyor according to claim 1, wherein at least the plate section has an upper side which consists of plastic, or of a plastic layer forming a wear protection and/or minimizing adhesion.

10. The slat conveyor according to claim 1, wherein the plate part and/or the chain connector part is (are) formed in "sandwich" structure.

11. The slat conveyor according to claim 1, wherein the movable plate section or the plate part has an underside provided with a wear layer or a sliding plate.

12. The slat conveyor according to claim 1, wherein an underside of the movable plate section or the plate part is provided with glide strips, in particular V-shaped, disposed oblique to the running direction.

13. The slat conveyor according to claim 1, wherein the movable plate section or plate part is provided with a first hinge assembly and the chain connector part or a plate section fixedly screw fastened to the chain connector part is provided with a second hinge assembly for pivotably connecting the plate section or plate part with the chain connector part via the hinge assemblies.

14. The slat conveyor according to claim 13, further comprising a sealing lip covering or overlapping the hinge assembly, over the length of the transport plate.

15. The slat conveyor according to claim 1, further comprising a guide means for the movable plate section of the plate part, the guide means being disposed in the delivery area and being adapted to return the movable plate section upwards in an exit region of the delivery area.

16. The slat conveyor according to claim 15, wherein the guide means extends across an entry region and the exit region of the delivery area and is adapted to cause an abrupt downward folding of the plate section in the entry region.

17. The slat conveyor according to claim 15, wherein
one of the stations is formed as a delivery station, which forms the delivery area, and
the guide means is disposed such that a return-pivoting movement of the movable plate section is concluded before the chain connector part of the transport plate would be redirected by 180° by the sprocket.

18. The slat conveyor according to claim 1, wherein the chain connector part is formed as a multipart chain block having at least two block parts which are connectable to one another at a horizontally-extending partitioning plane, for accommodating a horizontal chain link of the conveyor chain between the block parts in a manner that resists separation when a tensile force is applied.

19. The slat conveyor according to claim 18, wherein the lower block part includes a base plate having lateral edges that are oblique to the running direction.

20. The slat conveyor according to claim 18, wherein both block parts are provided with threaded screw holes on the plate part side for a detachable fastening a head plate that overlaps the partition plane, a plate section or a hinge assembly being fastenable or fastened to the head plate.

21. The slat conveyor according to claim 20, wherein the head plate extends over the length of the transport plate.

22. A transport plate for a slat conveyor for transporting material in mining and extraction systems, the transport plate comprising:
a connector part for attaching the transport plate to a chain link of a conveyor chain; and
a plate part connected to the chain connector part such that at least a plate section of the plate part is moveable relative to the chain connector part, the plate section being pivotable or foldable downwards relative to the chain connector part in a delivery area for the to-be-transported material.

23. The transport plate according to claim 22, wherein the plate section is pivotable or foldable downwards relative to the chain connector part about a horizontal axis in the delivery area for the to-be-transported material.

24. The transport plate according to claim 22, wherein the chain connector part or a plate section of the plate part, which is fixedly connected to the chain connector part, laterally borders a longitudinal side oriented in the running direction.

* * * * *